United States Patent [19] [11] 3,963,638
Bucher et al. [45] June 15, 1976

[54] LIQUID CRYSTAL COMPOSITIONS, METHODS AND DEVICES

[75] Inventors: Hermann K. Bucher; Thomas R. Criswell, both of Rochester, N.Y.

[73] Assignee: Eastman Kodak Company, Rochester, N.Y.

[22] Filed: Jan. 8, 1974

[21] Appl. No.: 431,648

[52] U.S. Cl. .............................. 252/299; 252/408; 350/150; 350/160 LC
[51] Int. Cl.² .................... C09K 3/34; G02F 1/13
[58] Field of Search ............... 252/408 LC, 299; 350/160 LC, 150

[56] References Cited
UNITED STATES PATENTS

| | | | |
|---|---|---|---|
| 3,656,834 | 4/1972 | Haller et al. | 252/408 |
| 3,803,050 | 4/1974 | Haas et al. | 252/408 |
| 3,809,456 | 5/1974 | Goldmacher et al. | 252/299 |
| 3,814,700 | 6/1974 | Aviram et al. | 252/408 |
| 3,838,059 | 9/1974 | Wong | 252/299 |
| 3,882,039 | 5/1975 | Sprokel | 252/299 |
| 3,888,566 | 6/1975 | Toriyama et al. | 252/299 |
| 3,920,576 | 11/1975 | Jones, Jr. et al. | 252/299 |

OTHER PUBLICATIONS

"Surface Active Agents and Detergents," vol. II., Schwartz; A., Perry; J., & Berch; J., Interscience Pubs., Inc., pp. 150–152 (1958).

"Surface Activity," Moilliet; J., & Collie; B., E. & F. N. Spon Ltd., pp. 249–266, 318–323, 330–338 (1951).

Primary Examiner—Benjamin R. Padgett
Assistant Examiner—T. S. Gron
Attorney, Agent, or Firm—Henry M. Chapin

[57] ABSTRACT

Dynamic scattering of nematic liquid crystalline compositions is enhanced by the addition of minor amounts of soluble salts having an organic carboxylate or organic sulfonate anion. The addition of these salts results in a lowering of the operating voltages necessary to obtain dynamic scattering.

11 Claims, 2 Drawing Figures

LIQUID CRYSTAL COMPOSITIONS, METHODS AND DEVICES

FIELD OF INVENTION

This invention relates to liquid crystal compositions and to electro-optical devices which modulate light. More particularly, the invention relates to the use of certain additives to liquid crystal compositions to enhance their dynamic scattering properties.

BACKGROUND OF INVENTION

Liquid crystal compositions are used in various electro-optical devices which involve the modulation of electromagnetic radiation, such as light valves and transmissive or reflective optical display devices. Such light valves are controlled by an electric field and operate when the nematic liquid crystal material is in its mesomorphic state.

Mesomorphism has been described as a state of matter with molecular order between that of a crystalline solid and a normal liquid. Crystalline solids are characterized by a non-random distribution of the molecules and a three-dimensional order in the location of the individual molecules within the crystal lattice. Normal liquids generally show isotropic behavior, for example, to light, due to the fact that the molecules of the liquid are randomly oriented.

In the mesomorphic state or mesophase of liquid crystal compositions, which are comprised of rod-shaped molecules, the directional arrangement of at least a part of the molecules is non-random. Among the various types of liquid crystal compositions, nematic liquid crystals are characterized by the fact that the long axes of the molecules maintain a parallel or nearly parallel arrangement to each other such that a one-dimensional order exists. Nematic liquid crystal compositions are usually characterized by a turbid appearance.

The mesophases of liquid crystal compositions exist over a temperature range which is dependent on the specific nature of the composition and molecular structure. Below this range the compositions become crystalline solids and above this range, the preferred directional alignment of the molecules is destroyed and a normal liquid having isotropic behavior results. Both of these phase changes are characterized by sharp transition points.

In the mesomorphic state, the anisotropic properties of the individual molecules are conferred upon the bulk material. In regard to dielectric properties, the dielectric constant ($\epsilon_\parallel$) parallel to the long axis of the molecules can be larger or smaller than the dielectric constant ($\epsilon_\perp$) perpendicular to the long axis of the molecules. If $\epsilon_\parallel$ is greater than $\epsilon_\perp$, such that $\epsilon_\parallel - \epsilon_\perp > 0$ or $\epsilon_\parallel / \epsilon_\perp > 1$, then the composition in question is said to have a positive dielectric anisotropy. On the other hand, if $\epsilon_\parallel$ is less than $\epsilon_\perp$, such that $\epsilon_\parallel - \epsilon_\perp < 0$ or $\epsilon_\parallel / \epsilon_\perp < 1$, then the composition is said to have a negative dielectric anisotropy.

This dielectric anisotropy is responsible in part for the utility of liquid crystalline compounds in various electrooptical devices which involve the modulation of light, such as light valves and optical display devices. Such light valves typically are controlled by an electric field and operate when the liquid crystalline material is in its mesomorphic state.

The anisotropic molecules can be aligned perpendicularly or uniaxially parallel to a surface giving a transparent appearance, and when an external magnetic of electric field above a threshold value is applied perpendicular to the surface, molecules with a negative dielectric anisotropy tend to orient perpendicularly to this field. However, this orientation is impeded by the presence of ions moving in the field which cause constant movement of the liquid crystal molecules (these molecules behaving as groups about $10^{-5}$ cm. in size) which is a dynamic state resulting in the scattering of light. Thus, the application of an electric or magnetic field brings about a change from a relatively transparent optical state to a translucent dynamic scattering state.

From Helfrich's theory [J. Chem. Phys., 51, 4092 (1969)] of the threshold voltage for the onset of electrohydrodynamic instabilities in liquid crystals the following criteria are extracted:

$$\sigma_\parallel / \sigma_\perp > \frac{1 - \epsilon_\perp / \epsilon_\parallel \; (1-C)}{C} \qquad \text{I.}$$

for the electric field applied perpendicular to the long axis of the liquid crystalline molecules and $$\sigma_\perp / \sigma_\parallel > \frac{1 - \epsilon_\perp / \epsilon_\parallel \; (1-C)}{C} \qquad \text{II.}$$

for the electric field applied parallel to the long axis of the molecules. In expressions I and II above, $\sigma$ refers to the conductivity and the subscripts $\parallel$ and $\perp$ refer to the component of the anisotropic material parameter relative to the direction of axis of preferred molecular interaction as used previously in connection with the dielectric constant. In order to create electrodynamic instabilities in a liquid crystalline material so as to result in intensive turbulence with concomitant high light scattering (dynamic scattering), the anisotropies of $\sigma$ and $\epsilon$ have to fulfill the above relations in which C accounts for the viscosity anisotropy.

Liquid crystalline materials with a negative dielectric anisotropy ($\epsilon_\parallel / \epsilon_\perp < 1$) will be oriented with the long axis perpendicular to the applied field and relation I above applies. On the other hand, materials with a positive dielectric anisotropy ($\epsilon_\perp / \epsilon_\parallel < 1$) will be oriented with the long axis parallel to the applied field and relation II applies. However, relation II requires that $\sigma_\perp / \sigma_\parallel > 1$ which is rarely ever observed in liquid crystalline materials. Thus, materials having a positive dielectric anisotropy are generally unsuited for dynamic scattering applications.

Of all liquid crystalline materials having a negative dielectric anisotropy, some are better suited than others for use in dynamic scattering applications and some are not useful at all because, for example, the magnitude of $\Delta\epsilon$ relative to $\Delta\sigma$ is not appropriate. Accordingly, there is a need in the art for a means of rendering nematic liquid crystalline materials having a negative dielectric anisotropy suitable for dynamic scattering.

SUMMARY OF THE INVENTION

We have found that many nematic liquid crystals having a negative dielectric anisotropy, but which do not exhibit dynamic scattering can be rendered suitable for dynamic scattering applications by the addition of certain organic dopants. Also, these dopants can improve the scattering ability of other nematic liquid crystals such as those which already exhibit some degree of scattering but which have threshold voltages which are too high for practical applications. Thus, the addition of the described dopants results in a lowering of the threshold voltage required for dynamic scattering.

DESCRIPTION OF PREFERRED EMBODIMENT

Figure 1:
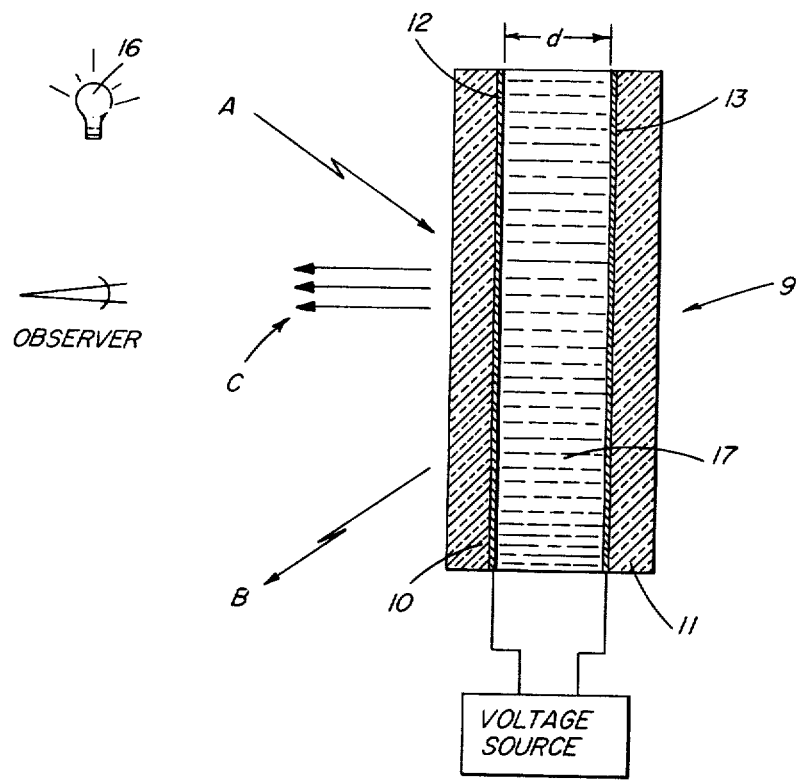
FIG. 1 is a schematic sectional view of an electro-optical display device.

The objects and advantages of this invention are provided through the addition of certain organic salts to nematic liquid crystals having a negative dielectric anisotropy.

The organic salts useful in accordance with the present invention include metal or ammonium salts of an organic carboxylate or an organic sulfonate. In particular, the anion of these salts should have the formula:

$$RX^-$$

wherein $X^-$ is a sulfonate ($-SO_3^-$) or a carboxylate ($-COO^-$) group and R is (1) an electronegatively substituted alkyl group having about 1 to 10 carbon atoms or (2) a phenyl or naphthyl group including substituted phenyl or naphthyl having at least one substituent selected from an alkyl group having about 1 to 10 carbon atoms (e.g., ethyl, methyl, isopropyl, butyl, octyl, decyl), a halogen atom (e.g., chloro, bromo, fluoro), a nitro group, a cyano group, an alkylsulfonyl group typically having about 1 to 4 carbon atoms, and the like. Preferred anions are benzoate or benzenesulfonate ions of the formula:

$$R'CO_2^- \text{ or } R''SO_3^-$$

wherein R' represents (a) a substituted phenyl group having at least one electronegative substituent such as a halogen atom, a nitro group, a cyano group, an alkylsulfonyl group as above, and the like or (b) a naphthyl group including (c) a naphthyl group having at least one electronegative substituent as described above for (a); and R'' represents the groups described for R' above as well as a phenyl or naphthyl group having as a substituent at least one alkyl group having 1 to 10 carbon atoms. "Electronegatively substituted alkyl group" as used herein, has reference to an alkyl group of about 1 to 10 carbon atoms, which has as a substituent on at least the $\alpha$ or $\beta$ carbon atoms at least one electron-withdrawing group such as a halogen atom (e.g., fluorine, chlorine), a nitro group, a cyano group, an alkylsulfonyl group (i.e., $-SO_2R$ in which R represents an alkyl group having 1 to about 4 carbon atoms) and the like. Similarly, "electronegative substituent" has reference to an electron-withdrawing group as described above. For a further discussion of electronegativity, reference is made to J. Hine, "Physical Organic Chemistry", 2nd ed., pp. 5 et.seq. and 32 et.seq., McGraw-Hill Book Company, Inc., New York, 1962, or to L. Pauling, "The Nature of the Chemical Bond", 3rd ed., pp. 85–105, Cornell University Press, Ithaca, New York, 1960.

The cation of the present salts appears to have little significant influence on the conductivity anisotropy. The cations, in general, are of larger size than the anion and aid the solubility of the salt in the liquid crystal composition. This solubility is brought about by the presence of one or more long chain paraffinic substituents (e.g., about 8 to 24 carbon atoms). These paraffinic substituents render the present salts soluble in the liquid crystal compositions at the concentrations of use. Typical useful cations are metal, ammonium or organic ammonium derivatives such as those of the formula:

$$(R''')_4N^+$$

wherein (a) each R''' is an alkyl group of about 1 to 24 carbon atoms, with the total carbon atom content of all four R''' groups being at least about 11 carbon atoms, or (b) any three of R''' can be taken together to represent the atoms (preferably carbon atoms) necessary to complete a 6- to 10-membered heterocyclic nucleus, including such substituted nuclei, for example, pyridinium, quinolinium, isoquinolinium, 2-(2-quinolylidenemethyl)quinolinium, and the like with the fourth R''' representing an alkyl group of about 8 to 24 carbon atoms. Included among preferred cations from the standpoint of availability and non-interfering properties are those having the formula:

$$(C_nH_{2n+1})_y(CH_3)_{4-y}N^+$$

where $n$ is an integer having a value of 4 to about 20 and $y$ is an integer having a value of 1 to 4. As mentioned above, the cation has very little, if any, effect on the conductivity anisotropy. Thus, in accordance with this invention, the cation can be selected from a variety of metal, ammonium or organic ammonium cations which are soluble in the liquid crystalline composition of choice. Particularly useful is the dimethyldioctadecyl ammonium cation. Other cations useful in the formation of dopants of this invention include pyridinium, quinolinium and cyanine dye cations having, respectively, the following structures:

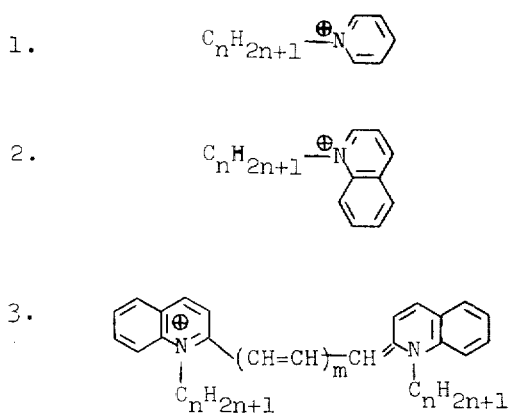

wherein $n$ is as described above and $m$ is an integer having a value of about 0 to 2.

The amount of dopant which must be added to achieve the desired effect can vary depending on the conductivity desired. In a preferred embodiment, nearly all of the conductivity arises from the dopant. Thus, the liquid crystals used are preferably in a highly pure state having as high a resistivity value as possible. An effective amount of the organic salt dopant will increase the positive conductivity anisotropy of the liquid crystal composition as well as the absolute conductivity. A typical concentration of dopant is $10^{-3}$ or less mole of dopant per average mole of liquid crystalline composition. "Average mole" as used herein is based on the average molecular weight of a give composition which may contain more than one liquid crystalline compound. Preferred concentrations typically are in the range of about $10^{-4}$ to $10^{-7}$ mole of dopant per average mole of liquid crystalline composition.

The liquid crystalline materials which can be usefully doped with the additives of the present invention include a wide variety of nematic liquid crystals having a negative dielectric anisotropy. From the standpoint of ease of handling, preferred materials are those having a broad mesophase. However, materials exhibiting a nematic mesophase in a very narrow temperature range are also useful, but may require special handling such as costly temperature control means. Among the numerous nematic compounds having a negative dielectric anisotropy or useful in forming liquid crystal mixtures having a negative dielectric anisotropy are p-anisylidene-p'-aminophenyl acetate, p-n-butoxybenzylidene-p'-aminophenyl acetate, p-n-octylbenzylidene-p'-aminophenyl acetate, N-(p-methoxybenzylidene)-p-butylaniline (MBBA), butyl-p-(p-ethoxyphenoxycarbonyl)phenyl carbonate, p-[N-(p-methoxybenzylidene)amino]phenyl acetate, p-[(p-methoxybenzylidene)amino]phenyl benzoate, ethoxybenzylidene-p-butylaniline (EBBA), 4-n-alkyl-4'-ethoxy-$\alpha$-chloro-trans-stilbenes having from about 1 to about 10 carbon atoms in the alkyl moiety, p-n-anisylidene-p'-aminophenyl butyrate, p-n-butoxybenzylidene-p'-aminophenyl pentanoate. In addition, mixtures such as eutectic mixtures of nematic compounds can be used, for example, MBBA and EBBA or mixtures of N-(p-valeryloxybenzylidene)-p-pentoxycarbonyloxyaniline and N-(p-acetoxybenzylidene)-p-methoxycarbonyloxyaniline, and other similar mixtures as described in Klanderman and Klingbiel U.S. application Ser. No. 415,197, filed Nov. 12, 1973, and entitled NEMATIC LIQUID CRYSTAL COMPOSITIONS (incorporated herein by reference). A great number of useful nematic compounds having a negative dielectric anisotropy are well known in the literature.

Previously, there have been suggestions of adding so-called conductivity agents to liquid crystal compositions. Such agents, as described, for example, in U.S. Pat. Nos. 3,499,112 and 3,656,834, are typically comprised of a simple, inorganic anion such as bromide, chloride, iodide or nitrate. While these prior agents are useful in effecting the absolute conductivity of a given liquid crystal composition, those same agents have no meaningful effect on the conductivity anisotropy of that composition. However, the particular anions of the ionic dopants of the present invention have a significant effect on the conductivity anisotropy which often results in a noticeable reduction of the threshold voltage needed for the onset of electro-hydrodynamic instabilities as well as in a reduction of the voltage required to produce dynamic scattering.

The doped nematic liquid crystalline compositions of this invention are useful in electro-optical display devices. A typical cell used in forming electro-optical devices is analogous to a parallel plate capacitor containing a liquid crystalline material with negative dielectric anisotropy as the dielectric. The plates are conductive and at least one of the plates is transparent. When no potential is applied across the two plates or walls, the cell appears substantially transparent. Upon the application of a d.c. or low frequency a.c. signal across the plates, the liquid crystalline material typically turns milky white. This white or cloudy condition is referred to as a scattering mode. In many scattering electro-optical cells, the cell becomes substantially transparent again when the voltage is removed.

FIG. 1 illustrates an optical display device 9 comprised of transparent cell walls 10 and 11 which are conductive, typically having a conductive layer 12 and 13 of, for example, indium oxide on the inner surfaces thereof. The walls 10 and 11 are usually spaced apart a distance d typically in the range of about 2 to about 250 microns with best results usually being obtained with a spacing of about 3 to about 100 microns. Liquid crystalline material 17 is contained within cell walls 10 and 11.

The layer of liquid crystalline material 17 is subjected to an electric field of sufficient magnitude to alter or modulate the light scattering properties of the layer. The light scattering property of material 17 is not affected until the electric field reaches a certain minimum threshold value. This value depends, of course, on the particular material or combination of materials being used, but is typically about $10^4$ volts per centimeter of layer thickness. In order to subject the layer to an electric field, display device 9 includes a voltage source 15 for applying a suitable electrical potential across conductive layers 12 and 13. The potential applied can be direct voltage, including pulsed direct voltage, or low-frequency alternating voltage and typically has a value between about 4 V. and about 80 V.

Device 9 can optionally have a reflective coating 14 when used in the reflective mode. Light source 16 can be positioned on either side of device 9. Source 16 would be on the side of device 9 opposite the observer when used in the transmissive mode. If used in the reflective mode, source 16 is located on the same side as the observer and typically is positioned so that the incident light is directed as shown by arrow A. In the zero or ground state, light which is not transmitted is reflected at an angle equal to the angle of incidence as shown by arrow B. When a voltage is applied, say, 15 V., the cell is placed in the scattering mode and, therefore, the angle of reflected light now changes until it is essentially normal to the plane of cell 10 as shown by arrows C.

The cell configuration can be in the form of two spaced walls having thereon conductive strips with the strips of one wall being arranged orthogonal to those of the other wall to form an $x$–$y$ grid. Each strip has a separate electrical connection to a voltage source. In this manner, a cross-conductor, addressable cell is formed which allows one to selectively apply the voltage necessary for dynamic scattering to any desired portion of the grid. By the use of suitable logic, solid-state electronic systems can be utilized to address a large scale cell of this type and display alphanumeric information.

Useful results have been obtained with salts of the following anions being employed as dopants according to the present invention:

A. Trifluoroacetate
B. Heptafluorobutyrate
C. Benzenesulfonate
D. p-Toluenesulfonate
E. p-Chlorobenzenesulfonate
F. 2-Chloro-5-nitrobenzenesulfonate G. p-Nitrobenzenesulfonate
H. 2,5-Dichlorobenzenesulfonate
I. 2-Chloro-3,5-dinitrobenzenesulfonate
J. p-Bromobenzenesulfonate
K. 2-Chloro-5-methylbenzenesulfonate
L. 2,5-Dimethylbenzenesulfonate
M. 2-Methyl-5-nitrobenzenesulfonate
N. 2-Naphthalenesulfonate
O. Pentafluorobenzoate Doping of liquid crystals in accordance with the process of this invention is accomplished by directly mixing the dopant with the liquid crystal composition in a ratio of about $1 \times 10^{-4}$ to $1 \times 10^{-7}$ mole of dopant per mole (average) of liquid crystal composition and agitating, for example, in an ultrasonic agitator, at a temperature of between about 20° to 100°C, preferably about 50°C, for a period of about 15 minutes to about 3 hours, preferably about 1 hour. The properties of representative liquid crystal compositions doped in accordance with this invention are described in the following Table I in which the salts are dimethyldioctadecylammonium salts of the anion designated under "Dopant". "Dopant P" is a control in which the anion is perchlorate (not part of this invention). The liquid crystal (LC) compositions are (I) the nine component equilibrated mixtures formed by combining a mixture of 2 molar parts of p[(p-methoxybenzylidene)amino]phenyl butyrate, 1 molar part of p[(p-butoxybenzylidene)amino]phenyl propionate and 1 molar part of N-(p-valeryloxybenzylidene)-p-pentoxycarbonyloxyaniline with about ½ percent by weight of an acidic transiminization catalyst and heating at 80°C for four hours, as in Example 1 of U.S. Ser. No. 415,197, referred to above; (II) a 2:1 by weight mixture of N-(p-valeryloxybenzylidene)-p-pentoxycarbonyloxyaniline and N-(p-acetoxybenzylidene)-p-methoxycarbonyloxyaniline; (III) composition "G" of Table II, Column 8 of J. E. Goldmacher et al, U.S. Pat. No. 3,540,796, purified to remove all catalyst; and (IV) N-(p-methoxybenzylidene)-p-butylaniline also referred to as MBBA.

The following examples are included for a further understanding of the invention. In these examples, the electrical potentials are applied to the liquid crystalline compositions using a cell arrangement similar to that shown in FIG. 1.

EXAMPLE 1

To the nematic liquid crystal III above, composed of the three compounds:

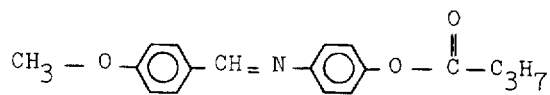

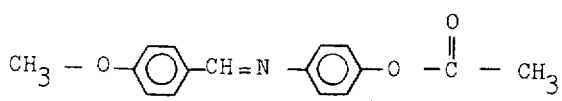

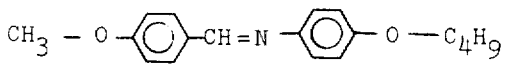

in equal parts is added the perchlorate salt of the "cyanine dye" compound of formula 3 on page 8 in which $n = 18$ and $m = 0$ until a $10^{-4}$ molar solution of the salt is reached. The doped mixture has a conductivity $\sigma \approx 5 \times 10^{-9}\ \Omega^{-1}\ cm^{-1}$ and $\sigma_\parallel /\sigma_\perp = 1.15$. This mixture does not exhibit dynamic scattering (D.S.) upon application of voltage up to 50 $V_{rms}$ as is predicted from calculations using relationship (I) above. That relationship, together with the material parameters $\epsilon_\parallel /\epsilon_\perp = 0.75$ and $c \approx 0.5$, shows that a $\epsilon_\parallel /\epsilon_\perp > 1.25$ is needed Table I

| Sample No. | Liquid Crystal Composition | Dopant | Mole Dopant per Mole Liquid Crystal Comp. | $\sigma_\parallel /\sigma_\perp$ | $\bar{\sigma}^*$ |
|---|---|---|---|---|---|
| 1 | IV | B | $4\times10^{-5}$ | 1.40 | 7.32 |
| 2 | IV | C | " | 1.44 | 4.52 |
| 3 | IV | D | " | 1.50 | 1.53 |
| 4 | IV | E | " | 1.46 | 3.22 |
| 5 | IV | F | " | 1.50 | 5.52 |
| 6 | IV | G | " | 1.46 | 3.63 |
| 7 | IV | H | $4\times10^{-5}$ | 1.46 | 7.18 |
| 8 | IV | I | " | 1.63 | 22.0 |
| 9 | IV | J | " | 1.54 | 4.09 |
| 10 | IV | K | " | 1.54 | 4.29 |
| 11 | IV | L | " | 1.55 | 4.24 |
| 12 | IV | M | " | 1.51 | 9.69 |
| 13 | IV | N | $4\times10^{-5}$ | 1.58 | 3.34 |
| 14 | IV | O | " | 1.79 | 11.7 |
| 15 | IV | P** | $1\times10^{-4}$ | 1.23 | 50 |
| 16 | II | E | $4\times10^{-5}$ | 1.22 | 4.89 |
| 17 | II | G | " | 1.24 | 7.72 |
| 18 | II | G | " | 1.20 | 4.90 |
| 19 | I | I | " | 1.96 | 29 |
| 20 | I | L | " | 1.92 | 12 |
| 21 | I | N | " | 2.04 | 12 |
| 22 | I | O | " | 2.1 | 19 |
| 23 | I | P** | " | 1.15 | 38 |
| 24 | III | D | $1\times10^{-4}$ | 1.59 | 50 |
| 25 | III | P** | $1\times10^{-4}$ | 1.15 | 50 |

$*\bar{\sigma}$ = Bulk Conductivity $\times 10^{10}$ ohm$^{-1}$cm$^{-1}$ = $[(\sigma_\parallel + 2\sigma_\perp)/3]10^{10}$ ohm$^{-1}$cm$^{-1}$
**Control in order for dynamic scattering to occur. To the same liquid crystal composition III (i.e., the three nematic materials shown above) is added a $10^{-4}$ molar of the p-toluenesulfonate salt of the above "cyanine dye" which yields a conductive mixture having $\sigma \approx 5 \times 10^{-9}$ $\Omega^{-1}$ cm$^{-1}$ and $\sigma_{\parallel}/\sigma_{\perp} = 1.59$. The composition having this $\sigma_{\parallel}/\sigma_{\perp}$ produces intense dynamic scattering upon the application of only 15 $V_{rms}$.

EXAMPLE 2

Figure 2:
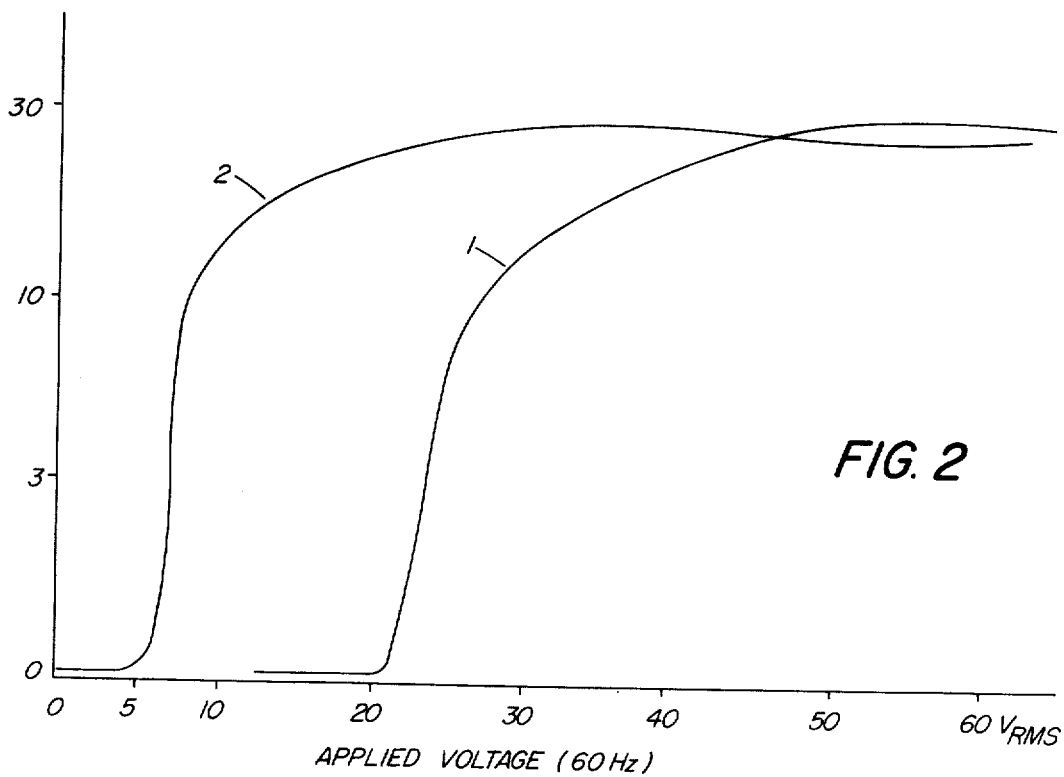
FIG. 2 is a graph of scattered light intensity versus applied voltage for a cell of this invention and for a control.

A portion of the nematic mixture I above is doped to $4 \times 10^{-5}$ molar concentration with (1) a control of dioctadecyldimethyl perchlorate, and a second portion of mixture I is similarly doped with (2) dioctadecyldimethyl-2-chloro-3,5-dinitrobenzenesulfonate. The bulk conductivity of both compositions is greater than $2 \times 10^{-9}$ ohm$^{-1}$ cm$^{-1}$ and high enough above the critical conductivity necessary to produce dynamic scattering under 60 Hz excitation. The conductivity anisotropy $\sigma_{\parallel}/\sigma_{\perp}$, the threshold voltage ($V_{th}$) for the onset of electro-hydrodynamic instabilities and the voltage required to produce dynamic scattering ($V_{DS}$) of the same intensity at an angle of 30° off-axis are as follows (compare FIG. 2):

| Dopant | $\sigma_{\parallel}/\sigma_{\perp}$ | $V_{th}$ | $V_{DS}$ |
|---|---|---|---|
| 1 | 1.15 – 1.23 | 22.5 | ~45 |
| 2 | 1.98 | 5.25 | ~20 |

The above data demonstrate that the higher the conductivity anisotropy, the lower the voltage required to produce electrohydrodynamic instabilities and dynamic scattering. The data further illustrate that p-toluenesulfonate salts of the invention have a larger $\sigma_{\parallel}/\sigma_{\perp}$ than perchlorate salts. The liquid crystal material employed in this example is of the Schiff-base type. However, the significant difference between the anions of this invention and prior art anions also holds for nematic materials of different chemical composition. A similar composition of liquid crystal mixture I above doped with dimethyloctadecylammonium 2-chloro-5-nitrobenzenesulfonate gives a composition having $\sigma_{\parallel}/\sigma_{\perp} = 1.56$ and a $\bar{\sigma}$ of 16.5.

EXAMPLE 3

The following mixtures of various liquid crystals (L.C.) with the dopant (1) dimethyloctadecylammonium p-toluenesulfonate or the control (2) dimethyloctadecylammonium perchlorate give the conductivity anisotropy ($\sigma_{\parallel}/\sigma_{\perp}$) values shown in Table II.

Table II

| Dopant | Liquid Crystal | $\sigma_{\parallel}/\sigma_{\perp}$ |
|---|---|---|
| 2 (control) | 4'-Ethoxy-4-butyl-α-chlorostilbene | 1.36 |
| 1 | " | 1.58 |
| 2 (control) | p-Pentylphenol-p-methoxy benzoate ester | 1.23 |
| 1 | " | 1.48 |
| 2 (control) | N-(p-methoxybenzylidene)-p-butylaniline | 1.22 |
| 1 | " | 1.48 |

These data demonstrate the increased conductivity anisotropy obtained with the salts of this invention.

The invention has been described in detail with particular reference to certain preferred embodiments thereof, but it will be understood that variations and modifications can be effected within the spirit and scope of the invention.

We claim:

1. A nematic liquid crystal composition which exhibits dynamic scattering upon subjecting a thin film of said composition to an electrical potential, said composition comprising:
   at least one nematic liquid crystalline compound having a negative dielectric anisotropy and an amount of an organic salt effective to aid dynamic scattering, said salt being soluble in said composition and having the formula:

$$M^+RX^-$$

wherein M$^+$ is a cation aiding solubility of said salt in said composition, said cation having the structure (R''λ')$_4$N$^+$ in which (a) each R''' is an alkyl group with the total carbon atom content of all four R''' groups being at least 11 or (b) any three of R''' taken together represent the carbon atoms necessary to complete a 6- to 10-membered heterocyclic nucleus and the fourth R''' represents an alkyl group of about 8 to 24 carbon atoms; and RX$^-$ represents an anion selected from the group consisting of p-chlorobenzenesulfonate, p-nitrobenzenesulfonate, 2,5-dichlorobenzenesulfonate, p-bromobenzenesulfonate, 2-chloro-5-methylbenzenesulfonate, 2-methyl-5-nitrobenzenesulfonate, 2-chloro-5-nitrobenzenesulfonate, 2-chloro-3,5-dinitrobenzenesulfonate, benzoate, and 2-naphthalenesulfonate.

2. A composition in accordance with claim 1 wherein said anion is selected from the group consisting of 2-chloro-5-nitrobenzenesulfonate, 2-chloro-3,5-dinitrobenzenesulfonate, and pentafluorobenzoate.

3. A composition as described in claim 1 in which RX$^-$ represents the anion 2-chloro-5-nitrobenzenesulfonate.

4. A composition as described in claim 1 in which RX$^-$ represents the anion 2-chloro-3,5-dinitrobenzenesulfonate.

5. A composition as described in claim 1 in which RX$^-$ represents the anion pentafluorobenzoate.

6. A composition as described in claim 1 wherein said salt is present at a concentration of about $10^{-4}$ to $10^{-7}$ mole of salt per average mole of liquid crystalline compound.

7. A nematic liquid crystal composition in accordance with claim 1 wherein in said structure (R''')$_4$N$^+$ each R''' is an alkyl group with the total carbon atom content of all four R''' groups being at least 11.

8. In an electro-optical display device comprising two closely spaced conductive walls having therebetween a nematic liquid crystalline composition which has a negative dielectric anisotropy, the improvement wherein said composition has dissolved therein a soluble organic salt of the formula:

$$M^+RX^-$$

wherein M$^+$ is a cation aiding solubility of said salt in said composition, said cation having the structure (R''λ')$_4$N$^+$ in which (a) each R''' is an alkyl group with the total carbon atom content of all four R''' groups being at least 11 or (b) any three of R''' taken together representing the carbon atoms necessary to complete a 6- to 10-membered heterocyclic nucleus and the fourth R''' represents an alkyl group of about 8 to 24 carbon atoms; and RX$^-$ represents an anion selected from the group consisting of p-chlorobenzenesulfonate, p-nitrobenzenesulfonate, 2,5-dichlorobenzenesulfonate, p-bromobenzenesulfonate, 2-chloro-5-methylbenzenesulfonate, 2-methyl-5-nitrobenzenesulfonate, 2-chloro-5-nitrobenzenesulfonate, 2-chloro-3,5-dinitrobenzenesulfonate, pentafluorobenzoate, and 2-naphthalenesulfonate.

9. In an electro-optical display device in accordance with claim 8, wherein in said structure $(R''')_4N^+$ each $R'''$ is an alkyl group with the total carbon atom content of all four $R'''$ groups being at least 11.

10. A method of enhancing the dynamic scattering properties of a nematic liquid crystalline composition which has a negative dielectric anisotropy comprising the step of adding to said composition about $10^{-4}$ to $10^{-7}$ mole of dopant per average mole of said composition, said dopant comprising a soluble organic salt having the formula:

$$M^+RX^-$$

in which $M^+$ is a cation aiding solubility in said composition, said cation having the structure $(R''')_4N^+$ in which (a) each $R'''$ is an alkyl group with the total carbon atom content of all four $R'''$ groups being at least 11 or (b) any three of $R'''$ taken together represent the carbon atoms necessary to complete a 6- to 10-membered heterocyclic nucleus and the fourth $R'''$ represents an alkyl group of about 8 to 24 carbon atoms; and $RX^-$ represents an anion selected from the group consisting of p-chlorobenzenesulfonate, p-nitrobenzenesulfonate, 2,5-dichlorobenzenesulfonate, p-bromobenzenesulfonate, 2-chloro-5-methylbenzenesulfonate, 2-methyl-5-nitrobenzenesulfonate, 2-chloro-5-nitrobenzenesulfonate, 2-chloro-3,5-dinitrobenzenesulfonate, pentafluorobenzoate, and 2-naphthalenesulfonate.

11. A method in accordance with claim 10, wherein in said structure $(R''')_4M^+$ each $R'''$ is an alkyl group with the total carbon atom content of all four $R'''$ groups being at least 11.

* * * * *